United States Patent [19]
Fugii

[11] 3,878,920
[45] Apr. 22, 1975

[54] CENTER-PULL BRAKE
[76] Inventor: Chiaki Fugii, 6-1 Nishikikuicho Nishiku, Nagoya, Japan
[22] Filed: Nov. 1, 1973
[21] Appl. No.: 411,340

[30] Foreign Application Priority Data
Jan. 22, 1973 Japan.......................... 48-10096[U]

[52] U.S. Cl.................................. 188/24; 188/2 D
[51] Int. Cl................................................ B62l 1/16
[58] Field of Search............................. 188/24, 2 D

[56] References Cited
FOREIGN PATENTS OR APPLICATIONS
394,277  6/1933  United Kingdom................... 188/24
900,881  10/1944  France................................. 188/24
1,270,686  7/1961  France................................. 188/24

Primary Examiner—George E. A. Halvosa
Attorney, Agent, or Firm—William Anthony Drucker

[57] ABSTRACT

A center-pull brake comprising a pair of brake shoes carrying arms pivoted on a brake base adapted to be attached to the front or rear of a bicycle frame, a flexible inner-wire engaging the upper ends of the arms so as to close and open them, a hollow and flexible outer-wire passed through by said inner-wire and such a release means, mounted on said brake base and holding the lower end of said outer-wire, that is adapted to adjust the position of the lower end of said outer-wire relative to said brake base.

2 Claims, 6 Drawing Figures

PATENTED APR 22 1975 3,878,920
SHEET 1 OF 3
FIG.1
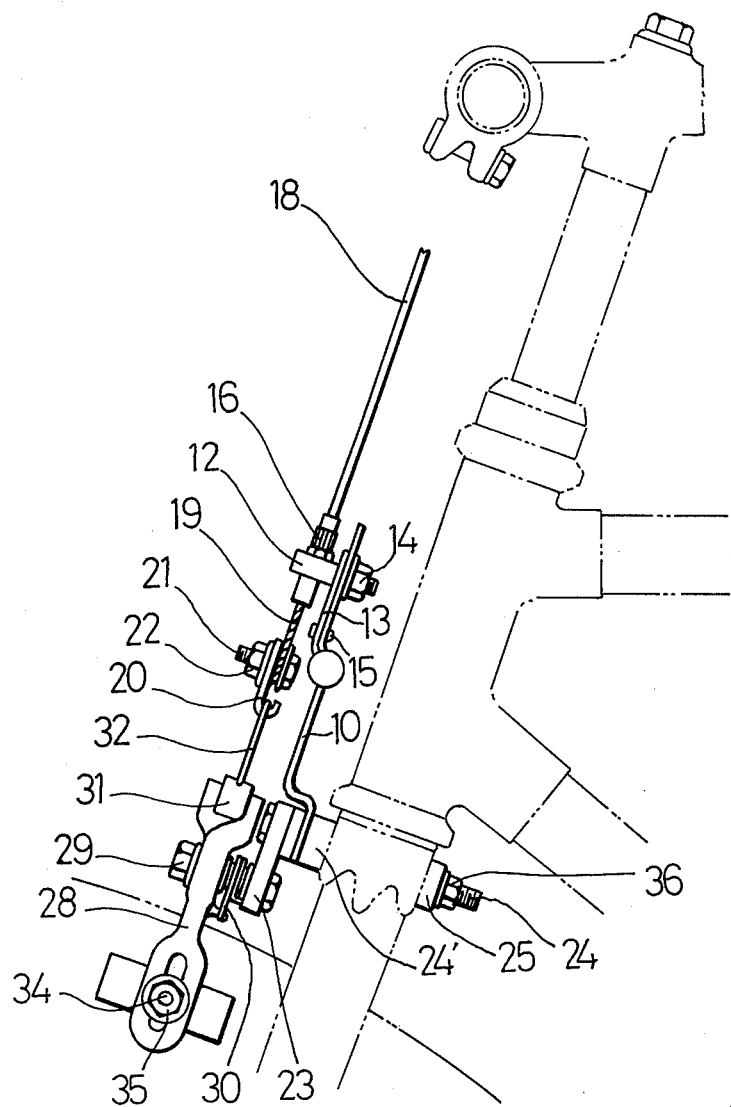
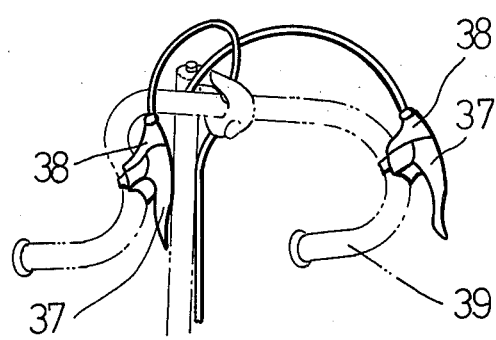
FIG.2

CENTER-PULL BRAKE

BACKGROUND OF THE INVENTION

This invention relates to an improvement in a center-pull brake for a bicycle. In a conventional brake of this type, a brake main body is separated from wires and wire holding means for actuating the brake main body and thus it has been pointed out as a fault and an inconvenience of the brake that the brake mounted on a bicycle does not work smoothly sometimes and the brake is difficult to be mounted on the bicycle. Namely, because metal fittings to hold wires are fixed on the rear frame of the bicycle by making use of a bolt and a nut to fix the rear frame on a seat-post, the outer-wire held by the metal fittings and the inner-wire inserted through it are bent at the bolt and nut and the inner-wire presses the inner surface of the outer-wire at their bent portions undesirably strong. This contact between wires prevents the smooth movement of the inner-wire and make the operation of the brake unsatisfactory. On the other hand, it is often impossible to move the wires, which are tightened to brake shoes through the metal fittings, completely along a straight line because there is a divergence of the forms of rear frames made by various makers and the non-linear movement of the wires increases the friction between the inner-wire and the outer-wire. Further, the divergence of the rear frame constructions makes it impossible to normalize the length of the wires and the adjustment of the wire length for each of different bicycles takes much time when the brake is mounted on the bicycle. If the adjustment is insufficient, the unilateral effect of the brake may result.

SUMMARY OF THE INVENTION

A center-pull brake according to the present invention comprises a pair of brake shoes carrying arms pivoted on a brake base adapted to be attached to the front or rear of a bicycle frame and a flexible inner-wire engaging the upper ends of the arms so as to close and open them. A hollow and flexible outer-wire is passed through the inner-wire and its lower end is held by a release means which is mounted on said brake base and adapted to adjust the position of the lower end of said outer-wire relative to said brake base. When the brake is mounted on a bicycle, the release means is turned to its releasing position to release the lower end of the outer-wire and the brake base is fixed on a suitable portion of the bicycle. After the upper ends of the wires are connected to a brake operating lever and a wire holder provided on the handle of the bicycle, the release means is returned to its wire straining or normal operating position to strain the wires. Attachment of the brake base to the front or rear of the bicycle frame prevents rotation of the brake base which would otherwise result in manipulating the cam 13 and would cause asymetrical rotational movements of the arms 27 and 28.

The salient relationships of the present invention being described, it will be understood that the present center-pull brake can be mounted on a bicycle in a very simple manner by mounting the brake base on the bicycle and returning the release means to its straining position without the troublesome adjustment of the length of the wires. It will be further understood that the brake can work smoothly because of its straight or linear construction near the lower end of the outer-wire and of being free from sharply bent portions of the wires and the unified construction of the brake main body and its actuating means is suitable for production and assembly independent of the construction and form of the bicycle. Many changes and modifications are possible without departing from the spirits and the claims.

Further features of the present invention will become clear from the detailed description taken in conjunction with the drawings, in which.

FIG. 1 is a side elevational view of a center-pull brake according to the present invention mounted on a bicycle;

FIG. 2 is a partial perspective view showing the bicycle provided with the center-pull brake;

Figure 3:
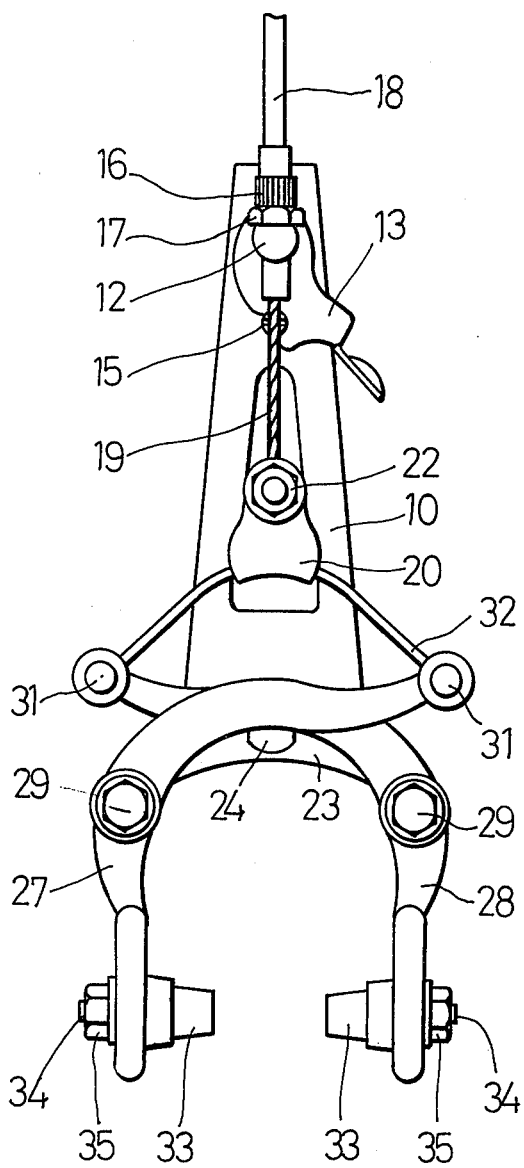
FIG. 3 is a front elevational view in partial section of the center-pull brake.
Figure 4:
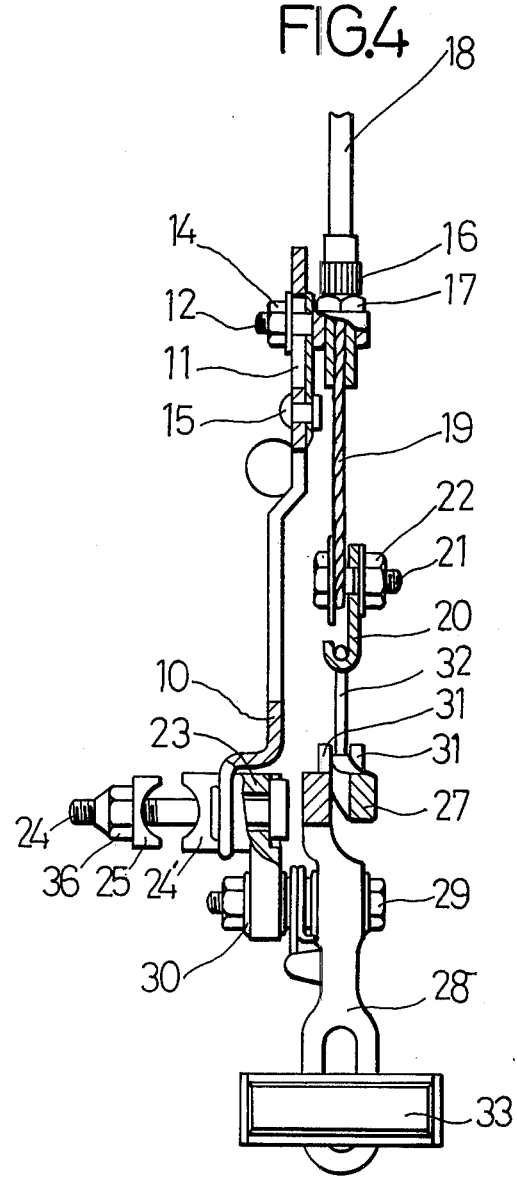
FIG. 4 is a side elevational view in partial section of the center-pull brake.

Referring to the drawings, the embodiments of the present invention are described. A brake base 10 has an elongate hole 11 in its upper portion and a hanger pin 12 is inserted through the elongate hole 11. 13 indicates an outer-wire release means which is illustrated as a cam mounted on the hanger pin 12 by a nut 14 for rotation together with the hanger pin 12. A guiding bolt 15 is screwed in the brake base 10 at a position near the elongate hole 11 where the bolt can contact with and guide the peripheral surface of the cam 13 as the cam 13 rotates. The position of the bolt 15 and the contour of the cam 13 are determined in such a manner that the hanger pin 12 can move slideably in the elongate hole 11 along its longitudinal direction as the hanger pin 12 is rotated as the result of the rotation of the cam 13. The release means is not necessarily the cam 13 illustrated but may be any one of well known constructions that can act as to establish a releasing position and a straining position, thus adjusting or changing the relative positions of the hanger pin 12 and the brake base 10. A hollow adjusting bolt 16 is screwed adjustably in the hanger pin 12 and is fixed by an adjusting nut 17. A hollow and flexible outer-wire 18 is connected to the upper end of the adjusting bolt 16 and a flexible inner-wire 19 is passed through the outer-wire 18 and the hollow adjusting bolt 16. The inner diameter of the hollow outer wire 18 should be such that the inner wire 19 can be moved substantially with the outer wire when the latter is actuated, but also the inner wire 19 can move positively and independently of the movement of the wire 18. The lower end of the inner-wire 19 is connected to a hook 20 by means of a bolt 21 and a nut 22. A pivot base 23 and the lower part of the brake base 10 are passed through by a long bolt 24, which has a sufficient length to pass through washers 24', 25 and a front frame 26 of a bicycle. The confronting surfaces of the washers 24' and 25 and are made cylindrically concave to fit with the frame 26. A left arm 27 and a right arm 28 are pivoted on the pivot base 23 by bolts 29 and are biased by a coil spring 30 so that they open outwards. A pair of metal fittings 31 are attached on the upper ends of the arms 27 and 28 and a center-wire 32 is stretched between the metal fittings 31. The wire hook 20 engages the center wire 32 at its hooked portion. A pair of brake shoes 33 are secured on the lower ends of the arms 27 and 28 by means of bolts 34 and nuts 35. Members indicated by 27 ~ 35 constitute a brake main body.

Figure 5:
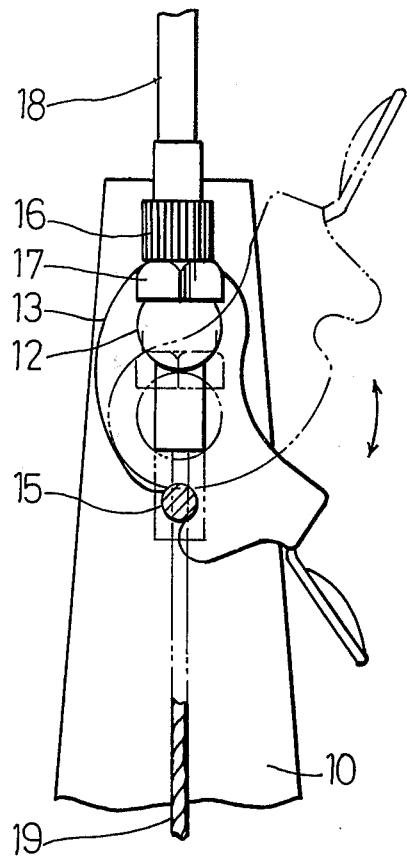
FIG. 5 is a front elevational view in partial section showing a release means for brake actuating wires and FIG. 6 is a side elevational view in partial section of the release means.
Figure 6:
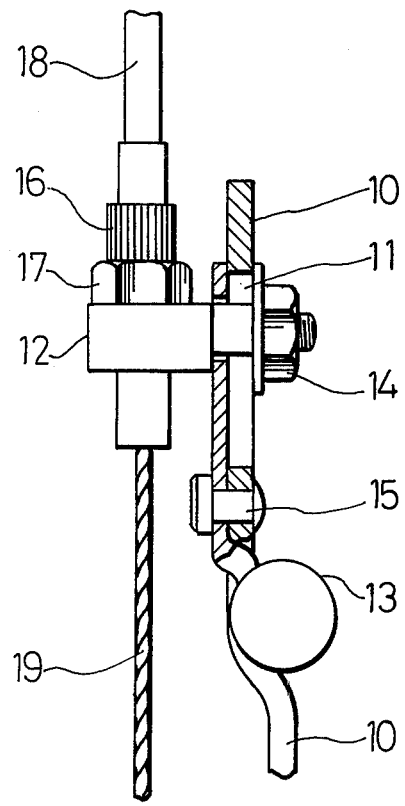

Next the way by which the center-pull brake mentioned above is mounted on a bicycle and the operation of the brake are described. Firstly, the cam or the release means 13 is rotated to a position shown by doubly dotted lines in FIG. 5 and the hanger pin 12 is lowered in the elongate hole 11. As the result, both the outer-wire 18 and the inner-wire 19 are lowered and the lower ends of the arms 27 and 28 open outwards due to the biasing force of said coil spring 30. The brake shoes 33 are separated from the other by a distance larger than that by which the brake shoes are separated when they are mounted operably. thus, the distance between the brake shoes 33 becomes large enough for the tire of the bicycle to be passed freely between the brake shoes 33. Next, the long bolt 24 is inserted in a through hole which is bored through the front frame 26 or the rear frame of the bicycle and is secured against the frame by means of a nut 36 and washers 24' and 25. Thus, not only the brake base 10 and the pivot base 23 forming the brake main body but also the inner-wire 19 and the outer-wire 18, which are unified with the brake base 10 as a brake operating means, can be mounted on the bicycle all at once. Then, a conventional brake lever 37 connected to the upper end of the inner-wire 19 and a conventional lever holder 38, to which the upper end of the outer-wire 19 is connected, are mounted on suitable positions of the handle 39 of the bicycle and thus, the mounting of the center-pull brake is completed. The cam 13 as a release means is returned to the position shown by solid lines to bring the brake shoes to each other to a distance suitable for the usual operation of the brake, the wires being strained. The fine adjustment of the distance between the brake shoes 33 can be done by rotating the adjusting nut 17 to change the position of the lower end of the outer-wire 18 with respect to the hanger pin 12. So long as there is not any expansion and contraction of the wires nor any displacement of their upper ends, also the inner-wire 19 can be moved against the brake base 10 by this adjustment as in the case when the cam 13 is operated. When the brake lever 37 is operated to its wire straining position after this adjustment, the inner-wire 19 is pulled up to move the brake shoes 33 inwardly towards each other and the brake becomes in position to work normally. In manipulating the cam 13, the brake base 10 is not rotated because it is attached to the frame of the bicycle.

Thus a cyclist can adjust the spacing between the brake shoes 33 himself with one hand by manipulating the cam 13 while with the other hand turning the adjusting bolt 16 and watching the degree of adjustment.

What is claimed is:

1. In a center-pull bicycle brake comprising: a brake base attached to a cycle frame; a pair of arms pivoted to said brake base at their intermediate portions; a pair of brake shoes secured on the lower ends of said arms; a flexible inner-wire engaging the upper ends of the arms so as to close and open said arms; a hollow and flexible outer-wire passed through by said inner-wire; the improvement in which a cam operated release means, mounted on said brake base and holding the lower end of said outer-wire, is adapted in a first adjusting position for relaxing said outer-wire and in a second operational position for straining said outer-wire.

2. In a bicycle brake according to claim 1, brake base mounting means including a pair of washers having concave surfaces complementary with the frame of the bicycle and a bolt passed through said washers and the brake base.

* * * * *